United States Patent
Lin et al.

(10) Patent No.: US 7,117,001 B2
(45) Date of Patent: Oct. 3, 2006

(54) SIMULTANEOUS VOICE AND DATA COMMUNICATION OVER A WIRELESS NETWORK

(75) Inventors: Jyh-Han Lin, Coral Springs, FL (US); Eric T. Eaton, Lake Worth, FL (US)

(73) Assignee: Motorola, Inc., Schaumburg, IL (US)

(*) Notice: Subject to any disclaimer, the term of this patent is extended or adjusted under 35 U.S.C. 154(b) by 212 days.

(21) Appl. No.: 10/700,716

(22) Filed: Nov. 4, 2003

(65) Prior Publication Data

US 2005/0096071 A1  May 5, 2005

(51) Int. Cl.
*H04B 7/00* (2006.01)
*H04Q 7/20* (2006.01)

(52) U.S. Cl. .................. 455/517; 455/450; 455/451; 455/509; 455/511; 455/466; 455/414.1; 370/493; 370/494; 375/358

(58) Field of Classification Search ............... 455/517, 455/450, 451, 509, 511, 466, 414.1; 370/493, 370/494, 503; 375/358
See application file for complete search history.

(56) References Cited

U.S. PATENT DOCUMENTS

| | | | |
|---|---|---|---|
| 6,493,338 B1* | 12/2002 | Preston et al. | 370/493 |
| 6,681,121 B1* | 1/2004 | Preston et al. | 455/556.1 |
| 6,690,681 B1* | 2/2004 | Preston et al. | 370/493 |
| 2002/0032853 A1* | 3/2002 | Preston et al. | 713/151 |
| 2002/0093924 A1* | 7/2002 | Preston et al. | 370/352 |
| 2002/0093990 A1* | 7/2002 | Preston et al. | 370/522 |
| 2002/0097706 A1* | 7/2002 | Preston et al. | 370/352 |
| 2002/0172193 A1* | 11/2002 | Preston et al. | 370/352 |
| 2002/0181446 A1* | 12/2002 | Preston et al. | 370/494 |
| 2004/0022272 A1* | 2/2004 | Rodman et al. | 370/494 |
| 2004/0219925 A1* | 11/2004 | Ahya et al. | 455/517 |
| 2004/0220803 A1 | 11/2004 | Chiu et al. | 704/214 |

* cited by examiner

*Primary Examiner*—George Eng
*Assistant Examiner*—Ariel Balaoing

(57) ABSTRACT

A system, method and computer readable medium for communicating data over a voice channel on a wireless device (300) is disclosed. The method on a wireless device (300) includes establishing an audio connection with a second device and providing an interface (326) for a user for sending data to the second device. The method further includes detecting the activation of the interface (326) by the user and sending a first data to the second device during the audio connection with the second device, wherein the quality of the audio connection is not affected by the sending. The method further includes receiving a second data from the second device, the second data being associated with the first data and preferably synchronizing the first data with the second data. Information, such as Vcard information, can be wirelessly exchanged between devices communicating data over a voice channel during an audio connection.

26 Claims, 5 Drawing Sheets

SIMULTANEOUS VOICE AND DATA COMMUNICATION OVER A WIRELESS NETWORK

FIELD OF THE INVENTION

The present invention generally relates to the field of communication systems, and more specifically relates to the transferring of data over a voice channel.

BACKGROUND OF THE INVENTION

With the advent of pagers and mobile phones the wireless service industry has grown into a multi-billion dollar industry. Recently, duplex wireless devices have grown in popularity. Duplex wireless devices allow for the exchange of voice and other information over the same channel. This is advantageous for multi-use wireless devices that perform other non-telephony functions such as the administering of contact information, calendar information, cataloging of images, video and audio. Users of multi-use wireless devices take advantage of the duplex nature of their products to talk and to exchange information. Current multi-use wireless devices, however, do not come without their drawbacks.

One problem with current multi-use wireless devices is that voice and data cannot be transmitted at the same time. That is, one function must be suspended in order to perform the other function. Thus, if a first party is currently involved in a telephone call and he desires to send a file to the other party via the wireless device, the first party must suspend his telephone call in order to send the file. This can be annoying and inconvenient to today's consumers.

Another problem with current multi-use wireless devices is that the exchange of data can be confusing and difficult to manage. The sending or receiving of data often involves navigation through a plethora of screens and menu selections in order to accomplish a simple task. This can be disconcerting and inconvenient for users of the wireless device. Furthermore, data that is exchanged is constantly being developed and modified. Thus, when data, such as contact information or a calendar entry, is exchanged via a wireless device, it is often necessary to later update that information when it has been modified. This involves recalling the recipients of the original data and determining the type of data exchange that had occurred. This can be a tedious and difficult task when large and various amounts of information are involved.

Therefore a need exists to overcome the problems with the prior art as discussed above.

SUMMARY OF THE INVENTION

Briefly, in accordance with the present invention, disclosed is a system, method and computer readable medium for communicating data over a voice channel on a wireless device. In an embodiment of the present invention, the method on a wireless device includes establishing an audio connection with a second wireless device and providing an interface for a user for sending data to the second wireless device. The method further includes detecting the activation of the interface by the user and sending a first data to the second wireless device during the audio connection with the second wireless device, wherein the quality of the audio connection is not affected by the sending. The method further includes receiving a second data from the second wireless device, the second data being associated with the first data and synchronizing the first data with the second data. The method further includes associating metadata with the first data, the metadata indicating that the first data was synchronized and automatically synchronizing the first data with the second data when the first data is modified and metadata associated with the first data indicates that the first data was synchronized.

In another embodiment of the present invention, a wireless device for communicating data over a voice channel includes a telephony processor for establishing an audio connection with a second wireless device and an interface for a user for sending data to the second wireless device. The wireless device further includes a detector for detecting the activation of the interface by the user and a first data for sending to the second wireless device during the audio connection with the second wireless device when the detector detects the activation of the interface, wherein the quality of the audio connection is not affected by the sending.

According to another embodiment of the present invention, a wireless communication device can communicate data on a voice channel. The wireless communication device comprising a processor for establishing an audio connection with a second remote terminal device; an indicator, communicatively coupled with the processor, for indicating to a user of the wireless communication device; and a memory, communicatively coupled with the processor, for storing a first information file and a second information file, and wherein the processor for sending first data to the second remote terminal device, the first data relating to the first information file, and wherein the processor further for receiving second data from the second remote terminal device and for storing the received second data in the memory as the second information file, the first data and the second data having been wirelessly transmitted over the voice channel during the audio connection with the second remote terminal device, and wherein the indicator for indicating that at least the second information file has been created in the memory.

In one embodiment, the second information file contains information relating to a Vcard.

The preferred embodiments of the present invention are advantageous because they provide for the transmission of non-voice data over a voice channel without affecting the quality of the voice channel. This allows for the transmission of greater and different types of information over the same channel. In addition, the preferred embodiments of the present invention are advantageous because they provide for the quick and easy updating of information that has been previously exchanged. As data is continuously modified and developed, the present invention allows for the expeditious dissemination of the data. This reduces the expending of resources used to constantly update and disseminate modified information.

DETAILED DESCRIPTION

The present invention, according to a preferred embodiment, overcomes problems with the prior art by providing a method, system and computer program product for allowing a wireless device to send, receive and synchronize data over an audio channel without affecting the quality of the audio channel.

Figure 1:
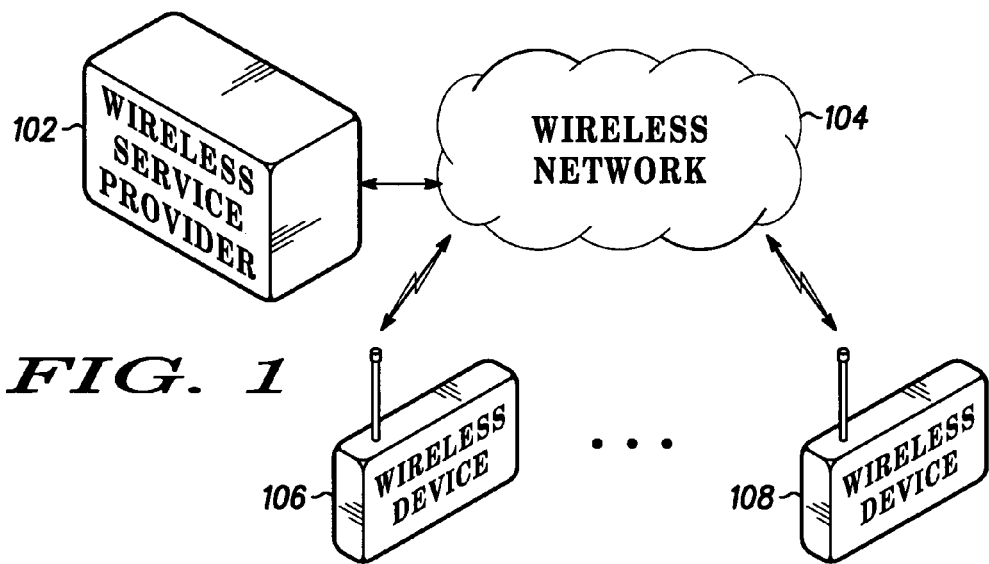
FIG. 1 is a block diagram illustrating a wireless communication system according to a preferred embodiment of the present invention.

FIG. 1 is a block diagram illustrating a wireless communication system according to a preferred embodiment of the present invention. The exemplary wireless communication system of FIG. 1 includes a wireless service provider 102, a wireless network 104 and wireless devices 106 through 108. The wireless service provider 102 is a first-generation analog mobile phone service, a second-generation digital mobile phone service or a third-generation Internet-capable mobile phone service. The exemplary wireless network 104 is a mobile phone network, a mobile text messaging device network, a pager network, or the like. Further, the communications standard of the wireless network 104 of FIG. 1 is Code Division Multiple Access (CDMA), Time Division Multiple Access (TDMA), Global System for Mobile Communications (GSM), General Packet Radio Service (GPRS), Frequency Division Multiple Access (FDMA) or the like.

The wireless network 104 supports any number of wireless devices 106 through 108, which are mobile phones, smart phones, push-to-talk mobile radios, text messaging devices, handheld computers, pagers, beepers, or the like. The wireless network 104 further supports duplex communications, allowing data and voice/audio information to be sent over the same channel. A wireless network 104 generally supporting duplex communications suitable for a wireless communication system, according to a preferred embodiment of the present invention, is described in more detail in commonly owned U.S. patent application Ser. No. 10/426,751, entitled "Method And Apparatus For Transferring Data Over A Voice Channel", and filed on Apr. 30, 2003, the entire teachings of which being hereby incorporated by reference.

In an embodiment of the present invention, the wireless network 104 is the Motorola Integrated Digital Enhanced Network (iDEN™), which is a wireless solution designed for a variety of mobile business applications. iDEN wireless devices can be utilized in a variety of work environments ranging from manufacturing floors to executive conference rooms as well as mobile sales forces. iDEN wireless devices provide a variety of functions including two-way digital radio; digital wireless phone; alphanumeric messaging; and data/fax capabilities leveraging Internet access technology. iDEN wireless devices further include a variety of features, including speakerphone, voice command, phone book, voice mail, digital two-way radio, mobile Internet and e-mail, wireless modems, voice activation, and voice recordings.

Figure 2:
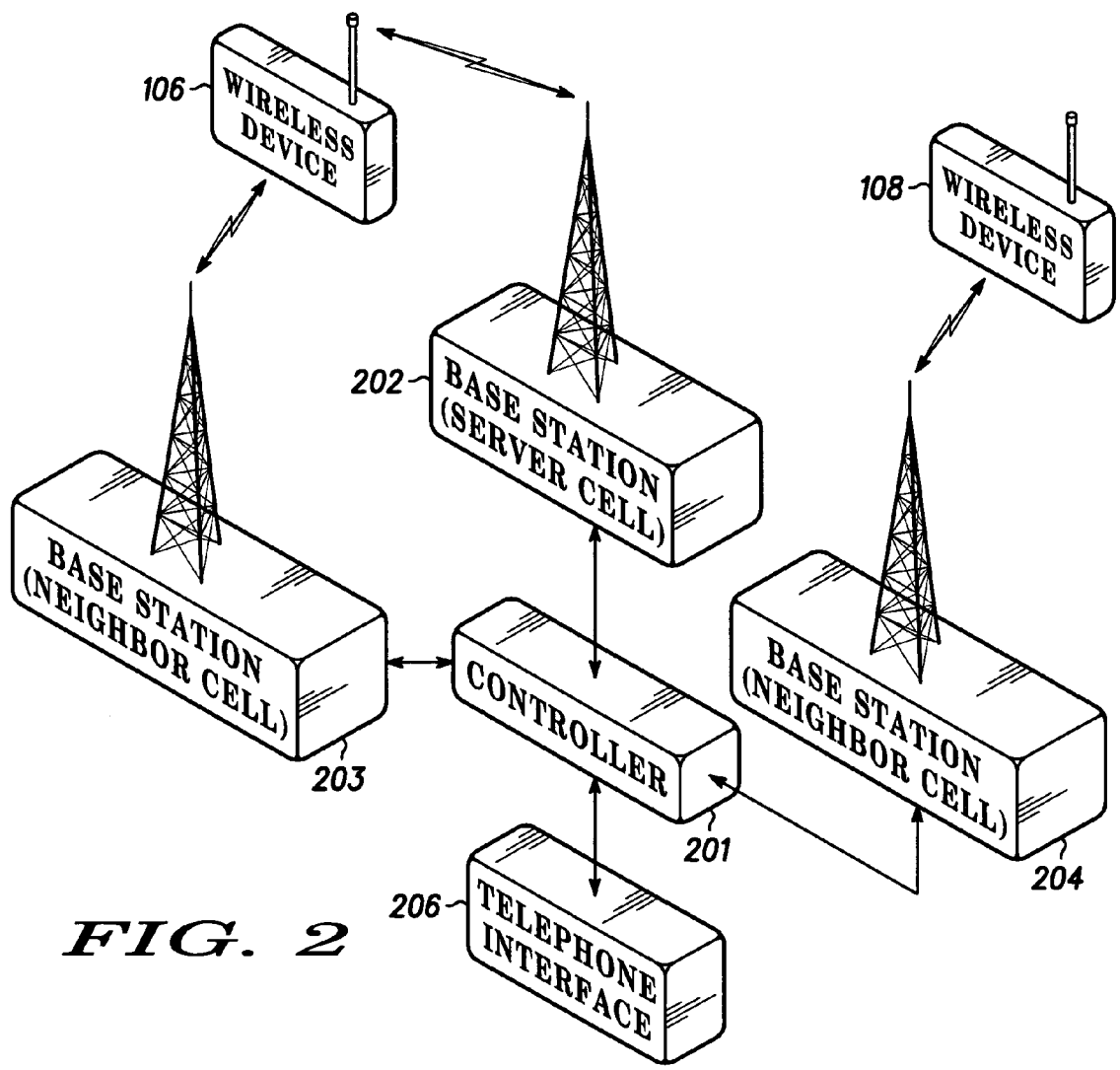
FIG. 2 is a more detailed block diagram of the wireless communication system of FIG. 1.

FIG. 2 is a more detailed block diagram of the wireless communication system of FIG. 1. The wireless communication system of FIG. 2 includes a controller 201 coupled to base stations 202, 203, 204. In addition, the wireless communication system of FIG. 2 is interfaced to an external network through a telephone interface 206. The base stations 202, 203, 204 individually support portions of a geographic coverage area containing subscriber units or transceivers (i.e., wireless devices) 106 and 108 (see FIG. 1). The wireless devices 106 and 108 interface with the base stations 202, 203, 204 using a communication protocol, such as CDMA, FDMA, TDMA, GPRS or GSM.

The geographic coverage area of the wireless communication system of FIG. 2 is divided into regions or cells, which are individually serviced by the base stations 202, 203, 204 (also referred to herein as cell servers). A wireless device operating within the wireless communication system selects a particular cell server as its primary interface for receive and transmit operations within the system. For example, wireless device 106 has cell server 202 as its primary cell server, and wireless device 108 has cell server 204 as its primary cell server. Preferably, a wireless device selects a cell server that provides the best communication interface into the wireless communication system. Ordinarily, this will depend on the signal quality of communication signals between a wireless device and a particular cell server.

As a wireless device moves between various geographic locations in the coverage area, a hand-off or hand-over may be necessary to another cell server, which will then function as the primary cell server. A wireless device monitors communication signals from base stations servicing neighboring cells to determine the most appropriate new server for hand-off purposes. Besides monitoring the quality of a transmitted signal from a neighboring cell server, the wireless device also monitors the transmitted color code information associated with the transmitted signal to quickly identify which neighbor cell server is the source of the transmitted signal.

Figure 3:
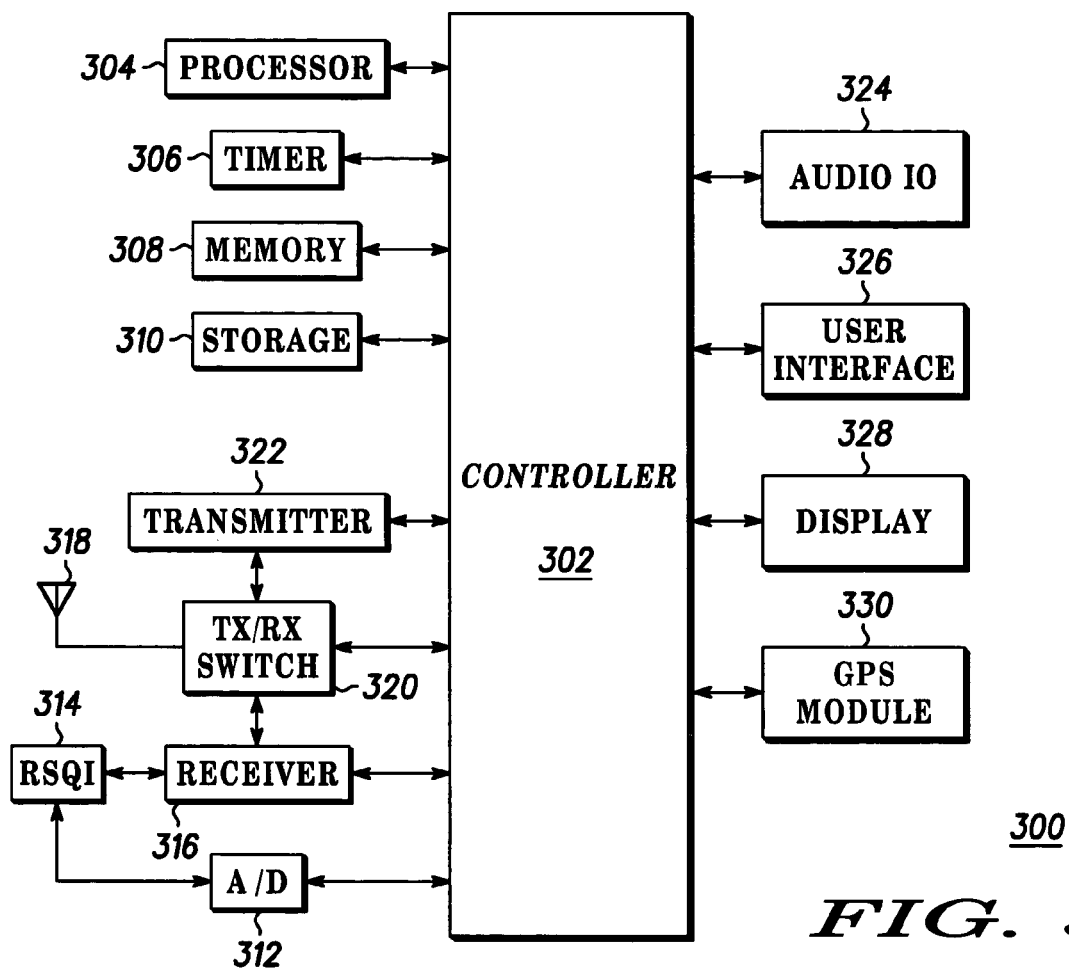
FIG. 3 is a block diagram illustrating a wireless device according to a preferred embodiment of the present invention.

FIG. 3 is a block diagram illustrating a wireless device 300 according to a preferred embodiment of the present invention. FIG. 3 shows a mobile telephone wireless device 300. In one embodiment of the present invention, the wireless device 300 is a two-way radio capable of receiving and transmitting radio frequency signals over a communication channel under a communications protocol such as CDMA, FDMA, TDMA, GPRS, GSM or the like.

The wireless device 300 operates under the control of a controller (or processor) 302, which switches the wireless device 300 between receive and transmit modes. As used herein with respect to a device or a system, the terms controller and processor are used interchangeably to represent control and/or processing functions and operations of a device or a system. In receive mode, the controller 302 couples an antenna 318 through a transmit/receive switch 320 to a receiver 316. The receiver 316 decodes the received signals and provides those decoded signals to the controller 302. In transmit mode, the controller 302 couples the antenna 318, through the switch 320, to a transmitter 322.

The controller 302 operates the transmitter 322 and receiver 316 according to instructions, data, and configuration parameters, stored in memory 308. The instructions, for example, include a neighbor cell measurement-scheduling algorithm. In preferred embodiments of the present invention, memory 308 comprises any one or any combination of non-volatile memory, Flash memory or Random Access Memory. A timer module 306 provides timing information to the controller 302 to keep track of timed events. Further, the controller 302 utilizes the time information from the timer module 306 to keep track of scheduling for neighbor cell server transmissions and transmitted color code information.

When a neighbor cell measurement is scheduled, the receiver 316, under the control of the controller 302, monitors neighbor cell servers and receives a "received signal quality indicator" (RSQI). An RSQI circuit 314 generates RSQI signals representing the signal quality of the signals transmitted by each monitored cell server. Each RSQI signal is converted to digital information by an analog-to-digital converter 312 and provided as input to the controller 302. Using the color code information and the associated received signal quality indicator, the wireless device 300 determines the most appropriate neighbor cell server to use as a primary cell server when hand-off is necessary.

Processor 304 in FIG. 3 performs various functions such as the functions attributed to the push-to-talk indicator, as described below. In various embodiments of the present invention, the processor 304 in FIG. 3 comprises a single processor or more than one processor for performing the tasks described below. FIG. 3 also includes a storage module 310 for storing information that may be used during the overall processes of the present invention.

In one embodiment, the wireless device 300 is a wireless telephone. For this embodiment, the wireless device 300 of FIG. 3 further includes an audio input/output module 324 for allowing the input of audio into the wireless device 300 and the output of audio for listening by a user. Wireless device 300 further includes a display 328 for displaying information to the user of the mobile telephone. Also included is a user interface 326 for allowing the user to interact with the wireless device 300. The user interface 326 can comprise a button or a group of buttons. In one embodiment, the interface comprises three buttons: a first button for sending data, a second button for receiving data and a third button for synchronizing data. The functions of the user interface 326 are described in greater detail below.

FIG. 3 also shows an optional Global Positioning System (GPS) module 330 for determining location and/or velocity information of the wireless device 300. This module 330 uses the GPS satellite system to determine the location and/or velocity of the wireless device 300. Alternative to the GPS module 330, the wireless device 300 may include alternative modules for determining the location and/or velocity of wireless device 300, such as using cell tower triangulation and assisted GPS.

Figure 4:
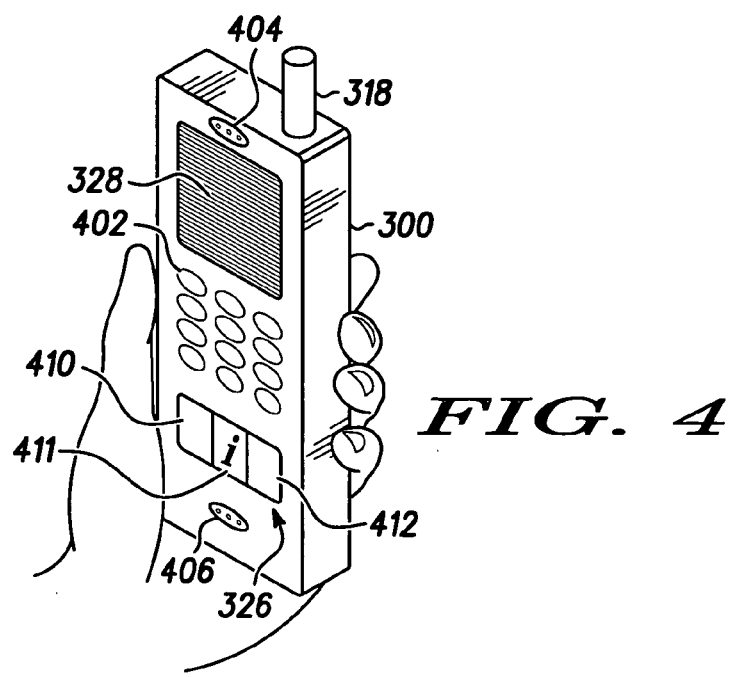
FIG. 4 is an illustration of a wireless device according to a preferred embodiment of the present invention.

FIG. 4 is an illustration of a wireless device 300 according to a preferred embodiment of the present invention. FIG. 4 shows a mobile telephone wireless device 300. The mobile telephone 300 is a two-way radio capable of receiving and transmitting radio frequency signals over a communication channel under a communications protocol such as CDMA, FDMA, TDMA, GPRS, GSM or the like.

The mobile telephone 300 includes a keypad 402, or interface, including a plurality of buttons for entering information, such as telephone numbers, and providing commands, such as answering a telephone call or initiating a telephone call. The keypad 402 is typically backlit to allow a user to see the buttons when the mobile telephone is located in an area having little or no ambient light. A keypad 402 can be backlit using a Light Emitting Device (LED), an Electro Luminescent (EL) panel or other light-emitting device.

The mobile telephone 300 further includes a display 328 for displaying information pertaining to the use of the mobile telephone 300, such as telephone numbers and call status information and visual indicators. The display 328 can be an LCD, a PDP or any other display type for presenting information. The display 328 is typically backlit to allow a user to see the display 328 when the mobile telephone 300 is located in an area having little or no ambient light. A display 328 can be backlit using an LED, an EL panel or other light-emitting device. The mobile telephone 300 further includes at least one indicator for communicating indications/alerts with a user of the device, e.g., the mobile telephone 300. An indicator, for example, may include any of a visual indicator, a display indicator, an audible indicator to generate audible indications/alerts for a user, and a tactile indicator to generate tactile indications/alerts for a user.

The mobile telephone 300 further includes an antenna 318 for sending and receiving information via radio frequency and a speaker 404/microphone 406 pair for allowing the user to hear audio and provide audio during a telephone call. Also shown in FIG. 4 is a user interface 326 electrically coupled with the controller 302 for communicating with a user of the mobile telephone 300, such as for sending data, receiving data, and synchronizing data over a voice channel during a telephone call. The voice channel communication can be with any other communication device, such as at least one of a cellular phone, a two-way radio, a wireless communication device, a telephone device, and any device that can support audio communications over a communications network comprising wired and/or wireless communication.

In FIG. 4, the user interface 326 comprises three buttons: a first button 410 for sending (or pushing) data, a second button 411 for synchronizing data, and a third button 412 for receiving (or pulling) data. Note that button 411 includes a symbol, comprising an italicized letter "i" for example. The functions of buttons 410, 411 and 412 are discussed in greater detail below. Please note that although this example is presented utilizing physical buttons on a user interface 326, it is obvious to those of ordinary skill in the relevant arts in view of the present discussion that the functions of buttons 410, 411 and 412 may be implemented using visual representations in a display, such as the display 328 shown as part of the user interface 326, or may alternatively be implemented using another representation as should be obvious to those of ordinary skill in the art in view of the present discussion. These visual representations may appear very similar to physical buttons and may visually exhibit similar operation and accept user input (e.g., such as selection of a button) from a user. For example, a user may make physical contact with such a visual representation on the screen of the display 328 to "press a button" on the display 328. This user input action by the user, for example, can be detected by the user interface 326, such as by sensors at the display 328 and/or by a touch screen on the display 328. This detection by the user interface corresponds to a detection of user input by the controller 302, the combination of the controller 302 and the user interface 326 constituting a detector for detecting the activation of the user interface 326 to provide user input by a user of the device, in this example being a mobile telephone 300. Please note also that the detector can be implemented using detection by the user interface 326 via any combination of user interface elements, such as by the buttons 410, 411 and 412, by the sensors at the display 328 and/or by a touch screen on the display 328, or by any combination of these elements and/or other equivalent elements of a user interface 326 as should be well known to those of ordinary skill in the art in view of the present discussion. The detected user input action at the display 328 would then be provided as a signal from the user interface 326 to the mobile telephone 300 in analogous fashion to detection of user input from a physical button 410, 411 and 412, at the user interface 326, in a manner well known to those of ordinary skill in the art.

Figure 5:
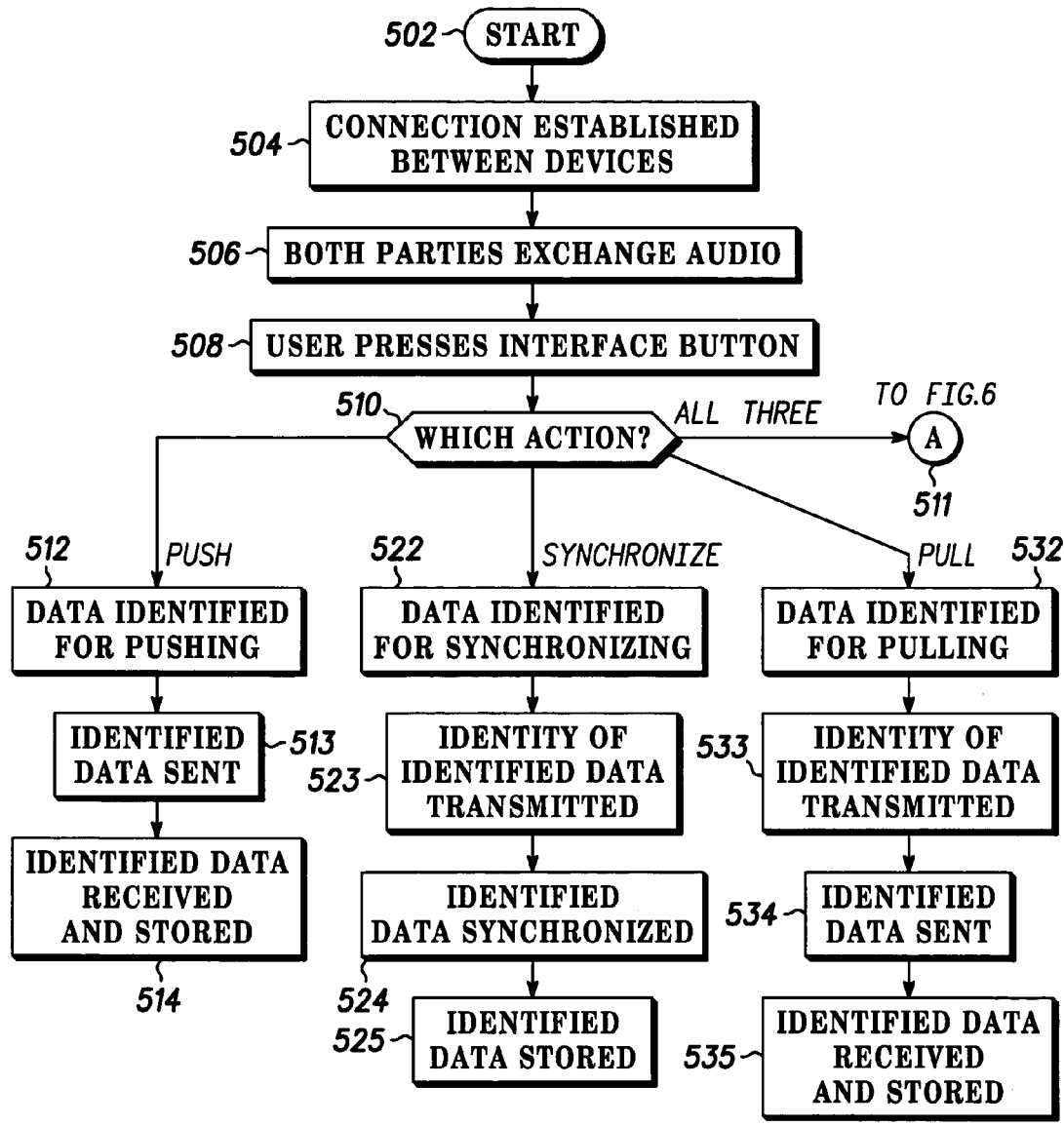
FIGS. 5 and 6 comprise an operational flow diagram illustrating an overall operational sequence according to a preferred embodiment of the present invention.
Figure 6:
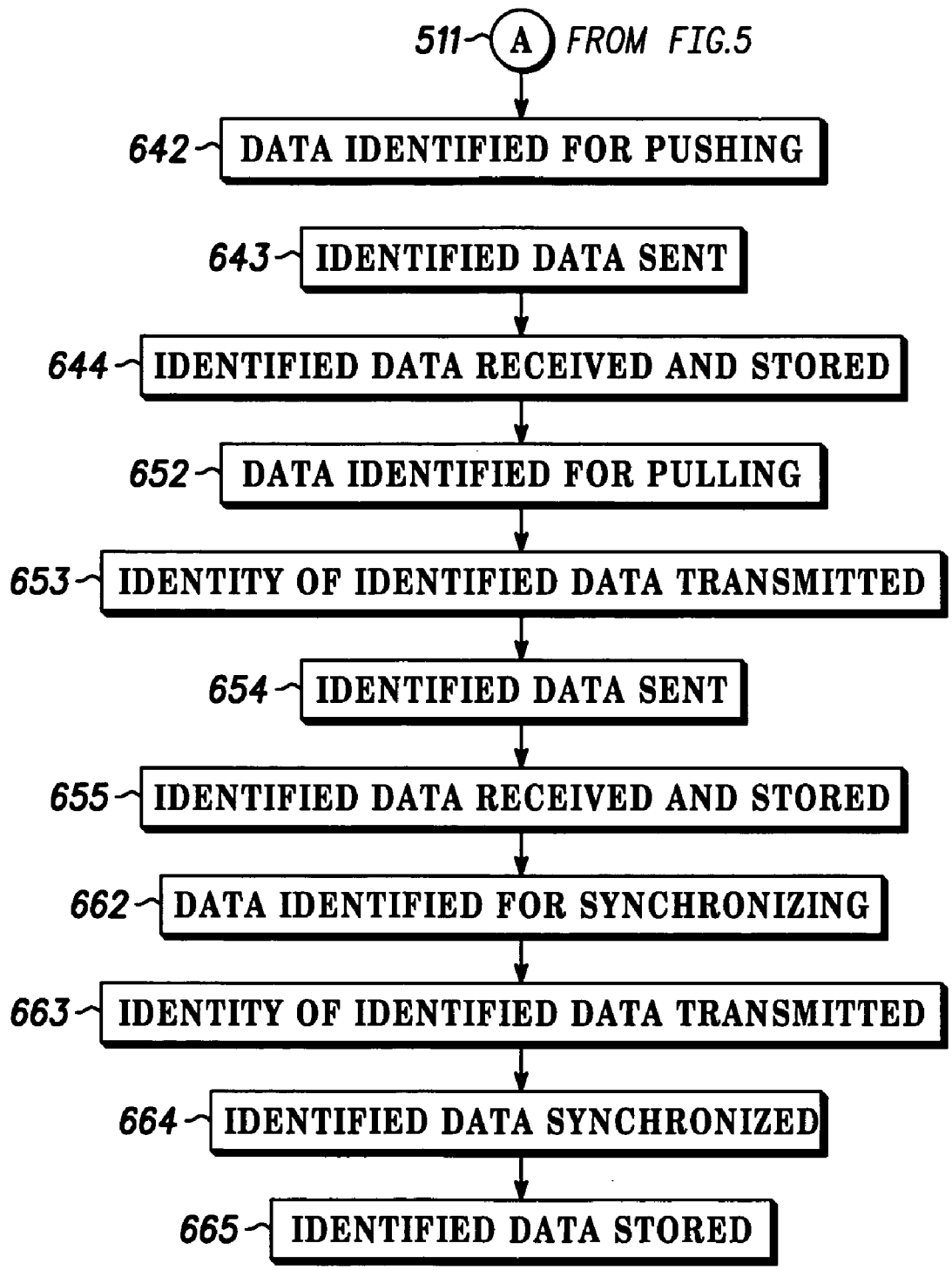

FIGS. 5 and 6 comprise an operational flow diagram showing an overall process according to a preferred embodiment of the present invention. The operational flow diagram of FIG. 5 depicts the overall process of data exchange between wireless devices, such as wireless devices 106 and 108, on a wireless network 104. The operational flow diagram of FIG. 5 begins with step 502 and flows directly to step 504.

In step 504, a connection is established between wireless device 106 and another wireless device 108. In one embodiment, the connection is an audio connection such as for a standard POTS telephone call. In step 506, the two parties, i.e., the users for wireless devices 106 and 108, exchange audio over the standard connection. In step 508, the user of wireless device 106 activates the user interface 326 comprising button 410 for sending (or pushing) data, button 411 for synchronizing data and button 412 for receiving (or pulling) data. In step 510, it is determined which buttons were pressed. If button 410 was pressed, then control flows to step 512. If button 411 was pressed, then control flows to step 522. If button 412 was pressed, then control flows to step 532. If all three buttons were pressed, then control flows to step 511, which is continued in FIG. 6.

In step 512, wherein button 410 for sending (or pushing) data was pressed, the wireless device 106 identifies the data for sending or pushing to the wireless device 108. In an embodiment of the present invention, the user of the wireless device 106 identifies the data for sending. The user accomplishes this task using a menu or other user interface for selecting an item for sending via the display 328 of the wireless device 106. The item that is sent can be any of a variety of items containing data, such as a phonebook entry, a calendar entry, a permission request (such as a permission request for recording the conversation), a facial icon (such as an emoticon), a text message, a contact information set (such as a V-card), an application, or the like.

In step 513, the wireless device 106 sends the identified data. In step 514, the data sent by wireless device 106 is received by the wireless device 108 and stored in memory. The transmission of data is not limited to the two devices and any number of devices may be in communication for transmission of the data, as would be obvious to those of ordinary skill in the art in view of the present discussion. The push operation described above occurs during the telephone call and does not affect the quality of the telephone call. In an optional step, metadata is associated with the identified data and stored on the wireless devices 106 and 108. The metadata includes information regarding the date and time of the data exchange, the parties involved and other information about the identified data.

In step 532, wherein button 412 for receiving (or pulling) data was pressed, the wireless device 106 identifies the data for receiving or pulling from the wireless device 108. The transmission of data is not limited to the two devices and any number of devices may be in communication for transmission of the data, as would be obvious to those of ordinary skill in the art in view of the present discussion. In an embodiment of the present invention, the user of the wireless device 106 identifies the data for pulling. The user accomplishes this task using a menu or other user interface for selecting an item for pulling via the display 328 of the wireless device 106. In one alternative, the wireless device 106 sends a message to the wireless device 108 requesting a list of all or some of the items on the wireless device 108 that are available for pulling. The wireless device 108 responds to the wireless device 106 with a list. In step 533, the wireless device 106 sends a message to the wireless device 108 indicating the identity of the item that the wireless device 106 desires to pull from the wireless device 108.

The item that is pulled from wireless device 108 by wireless device 106 can be any of a variety of items containing data, such as a phonebook entry, a calendar entry, a permission request, a facial icon, a text message, a contact information set, an application, or the like. In step 534, the wireless device 108 sends the identified data. In step 535, the data sent by wireless device 108 is received by the wireless device 106 and stored. The pull operation described above occurs during the telephone call and does not affect the quality of the telephone call. In an optional step, metadata is associated with the identified data and stored on the wireless devices 106 and 108. The metadata includes information regarding the date and time of the data exchange, the parties involved and other information about the identified data.

In step 522, wherein button 411 for synchronizing data was pressed, the wireless device 106 identifies the data for synchronizing with the wireless device 108. The synchronization of data is not limited to the two devices and any number of devices may be in communication for synchronization of the data, as will be obvious to those of ordinary skill in the art in view of the present discussion. Note also that a synchronizer for this advantageous feature of a device, such as wireless device 106, can be implemented by the processor/controller 302 operating according to software routines and algorithms, and related data and parameters and optionally at least one information file, stored in the memory 308, as will be discussed in more detail below. In an exemplary embodiment of the present invention, the user of the wireless device 106 identifies the data for synchronizing. The user accomplishes this task using a menu or other user interface for selecting an item for synchronizing via the display 328 of the wireless device 106. In one alternative, the wireless device 106 sends a message to the wireless device 108 requesting a list of all or some of the items on the wireless device 108 that are available for synchronizing. The wireless device 108 responds to the wireless device 106 with a list. In step 523, the wireless device 106 sends a message to the wireless device 108 indicating the identity of the item that the wireless device 106 desires to synchronize with from the wireless device 108.

The item that is synchronized between wireless device 108 and wireless device 106 can be any of a variety of items containing data, such as a phonebook entry, a calendar entry, a permission request, a facial icon, a text message, a contact information set, an application, or the like. In step 524, the wireless device 106 synchronizes the identified data with wireless device 108. In step 525, the data is synchronized between both wireless devices and stored as such. The synchronization operation described above occurs during the telephone call and does not affect the quality of the telephone call. In an optional step, metadata is associated with the synchronized data and stored on the wireless device 106 and 108. The metadata includes information regarding the date and time of the data exchange, the parties involved and other information about the synchronized data.

In step 511, wherein all buttons were pressed, the operational sequence flows from FIG. 5 to FIG. 6 (see connector A 511 connecting the flow in FIG. 5 to the flow in FIG. 6). With reference to FIG. 6, an operational flow diagram continues the operational flow sequences of FIG. 5. In step 642 of FIG. 6, the wireless device 106 identifies the data for sending or pushing to the wireless device 108 or any other suitable device. In an exemplary embodiment of the present invention, the user of the wireless device 106 identifies the data for sending. In step 643, the wireless device 106 sends the identified data. In step 644, the data sent by wireless device 106 is received by the wireless device 108 and stored.

In step 652, the wireless device 106 identifies the data for receiving or pulling from the wireless device 108 or any other suitable device. In an exemplary embodiment of the present invention, the user of the wireless device 106 identifies the data for pulling. In one alternative, the wireless device 106 sends a message to the wireless device 108 requesting a list of all or some of the items on the wireless device 108 that are available for pulling. The wireless device 108 responds to the wireless device 106 with a list. In step 653, the wireless device 106 sends a message to the wireless device 108 indicating the identity of the item that the wireless device 106 desires to pull from the wireless device 108. In step 654, the wireless device 108 sends the identified data. In step 655, the data sent by wireless device 108 is received by the wireless device 106 and stored.

In step 662, the wireless device 106 identifies the data for synchronizing with the wireless device 108 or any other device, such as the personal computer of the user of wireless device 106. In an exemplary embodiment of the present invention, the user of the wireless device 106 identifies the data for synchronizing. In one alternative, the wireless device 106 sends a message to the wireless device 108 requesting a list of all or some of the items on the wireless device 108 that are available for synchronizing. The wireless device 108 responds to the wireless device 106 with a list. In step 663, the wireless device 106 sends a message to the wireless device 108 indicating the identity of the item that the wireless device 106 desires to synchronize with from the wireless device 108. In step 664, the wireless device 108 synchronizes the identified data with wireless device 108. In step 665, the data is synchronized between both wireless devices and stored as such.

The push, pull and synchronizing operations described above can occur during a telephone call and do not affect the quality of the telephone call. In an optional step, metadata is associated with the synchronized data and stored on the wireless device 106 and 108. The metadata includes information regarding the date and time of the data exchange, the parties involved and other information about the synchronized data.

In an exemplary embodiment of the present invention, when the user activates all three buttons 410, 411, 412 substantially at the same time, or one at a time, (as in step 511) the information that was exchanged is tagged with a symbol or icon (such as the symbol on the button 411 in FIG. 4) indicating that all three methods of communication have been used for this information. If all three buttons were activated by the user at one time the symbol would light up to indicate that all three buttons were successfully pushed. For example, when exchanging a Vcard with another person, pushing the three buttons would push a first party's Vcard to the second party, pull the Vcard of the second party, and synchronize the new Vcard with the first party's personal computer, all via cellular communications. The Vcard stored in memory in the devices of both parties would be tagged with an icon indicating this type of transaction has occurred. The information exchanged between a first device and second devices (e.g., devices of both parties) can be stored in memory in the local device, for example, as an information file. The information exchanged when completely stored in memory of a device, such as an information file, preferably completes a predefined set of information exchanges between the first and second devices. The information from the second device (e.g., as a second information file) that is stored in the first device as a result of the exchange of information, according to one embodiment, relates to the information that has been previously stored in the first device (e.g., as a first information file). For example, parties can exchange Vcards or other documents. Note that the second information file does not need to contain the same information as the first information file. Additionally, preferably at least one indicator, e.g., a visual indicator, an audible indicator, and a tactile indicator, at the first device, indicates to a user of the device when at least the second information file has been created in the memory.

Another example would be a calendar appointment. By utilizing the three buttons, the calendar appointment would be pushed to others as well as synchronized with the first party's PC. Again, the calendar entry would carry the icon indicating that this information is on the wireless device, on the PC, and shared with others. Subsequently clicking on the icon would indicate the parties with which the first party has "exchanged data". In the instance of a message, one can select the symbol, which would indicate with whom, when and what the first party has transferred via these communication methods relating to this message.

The symbol provides the ability to quickly see that a document has been synchronized with a PC and also indicates that a related document, not necessarily the same document (depending on the current function) has been shared with others. The Vcard is an example of two different documents, a first party's and a second party's, that are related but not the same. Thus, this example is not necessarily the same as indicating multiple users have a copy of the same document. A calendar appointment is an example of same information being located everywhere. The symbol indicates that several entities have been sent copies or information related to a document. If changes are made to the document, the parties that received the original document are known by clicking on the icon. By updating a document (and then optionally clicking on the icon), the new document can be synchronized with the parties that received the original document.

Figure 7:
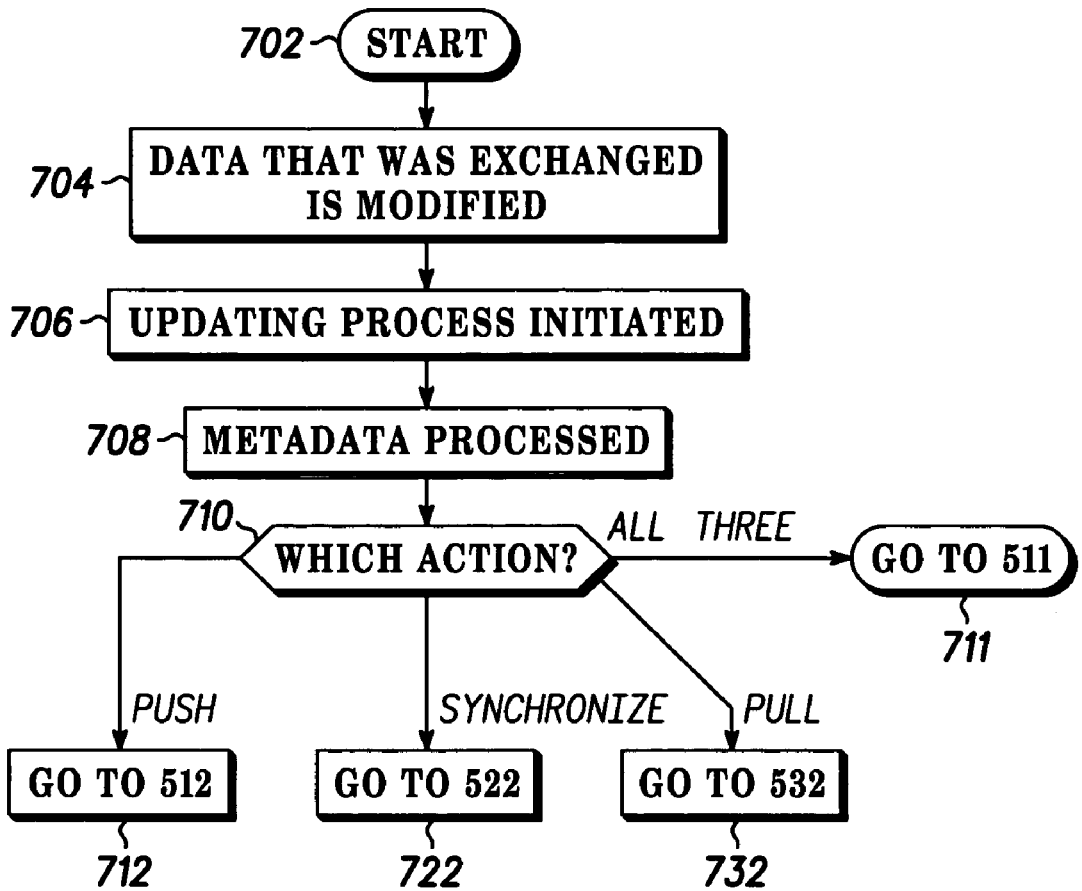
FIG. 7 is an operational flow diagram showing an updating process according to a preferred embodiment of the present invention.

FIG. 7 is an exemplary operational flow diagram showing an updating process of a preferred embodiment of the present invention. The operational flow diagram of FIG. 7 depicts the process of updating data between wireless devices, such as wireless devices 106 and 108, on a wireless network 104. FIG. 7 picks up after any one of the following processes, described in greater detail above with reference to FIGS. 5 and/or 6: the push process of steps 512–514, the pull process of steps 532–535, the synchronization process of steps 522–525, and the push/pull/synchronize combination process of steps 642–665. The operational flow diagram of FIG. 7 begins with step 702 and flows directly to step 704.

In step 704, the data that was exchanged (whether pushed, pulled, synchronized or all of the former) is modified. In step 706, the updating process is initiated. In one embodiment, the updating process is initiated by the user clicking on the icon associated with the data that was exchanged. In another embodiment, the updating process is initiated automatically when the data that was exchanged is modified.

In step 708, the metadata associated with the data that was exchanged is processed. Recall that after each data exchange metadata is associated with the exchanged data and stored on the wireless devices of all parties involved. The metadata includes information regarding the date and time of the data exchange, the parties involved and other information about the exchanged data.

In step 710, the identity of the parties involved is determined from the metadata, as well as the type of the original data exchange (whether pushing, pulling, synchronizing or all of the former). Subsequently, the original actions are performed again. If pushing occurred, then in step 712, control flows to step 512. If pulling occurred, then in step 732, control flows to step 532. If synchronizing occurred, then in step 722, control flows to step 522. If all three actions occurred, then in step 711, control flows to step 511, which is continued in FIG. 6.

The present invention can be realized in hardware, software, or a combination of hardware and software in the wireless device 300. A system according to a preferred embodiment of the present invention can be realized in a centralized fashion in one computer system (of the wireless device 300), or in a distributed fashion where different elements are spread across several interconnected computer systems. Any kind of computer system—or other apparatus adapted for carrying out the methods described herein—is suited. A typical combination of hardware and software could be a general purpose processor with a computer program that, when being loaded and executed, controls the processor such that it carries out the methods described herein. For example, as discussed above, the detector can be implemented using the controller 302 coupled with the user interface 326, where software, parameters, and data, can be stored in the memory 308 that is coupled with the processor/controller 302. The controller 302 operates according the software routines and algorithms stored in the memory 308 to implement the detector. As a second example, a synchronizer can be implemented by the processor/controller 302 operating according to software routines and algorithms, and related data and parameters and optionally at least one information file, stored in the memory 308. The controller 302 couples data with the receiver 316 and the transmitter 322 to receive data and send data from/to the voice channel, as has been discussed above, thereby synchronizing data over a voice channel during a telephone call.

The present invention can also be embedded in a computer program product (e.g., in the wireless device 300), which comprises all the features enabling the implementation of the methods described herein, and which—when loaded in a system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method in a wireless device for communicating data over a voice channel, comprising:
   establishing an audio communication between a wireless device and a second wireless device across the voice channel, wherein the voice channel comprises at least a wireless voice communications channel between the wireless device and the second wireless device;
   providing a user interface for a user to use the wireless device for communicating data between the wireless device and the second wireless device across the voice channel;
   detecting the activation of the user interface by the user;
   communicating over the voice channel a first data between at least the wireless device and the second wireless device substantially during wireless audio communication between the wireless device and second wireless device over the voice channel; and
   wirelessly transmitting the first data from the wireless device into the voice channel and destined for reception by the second wireless device and wirelessly receiving the second data from the voice channel, the second data having been transmitted by the second wireless device into the voice channel, the second data being associated with the first data.

2. The method of claim 1, further comprising:
   wirelessly transmitting the first data from the wireless device into the voice channel and destined for reception by the second wireless device; or
   wirelessly receiving the first data at the wireless device from the voice channel, the first data having been transmitted by the second wireless device into the voice channel.

3. The method of claim 1, further comprising:
   synchronizing the first data with a second data for both the wireless device and the second wireless device by wireless communication therebetween over the voice channel.

4. The method of claim 3, further comprising:
   associating metadata with the first data, the metadata indicating that the first data was synchronized.

5. The method of claim 4, further comprising:
   automatically synchronizing the first data with the second data when the first data is modified and metadata associated with the first data indicates that the first data was synchronized.

6. The method of claim 1, wherein the wireless device comprises a mobile telephone.

7. The method of claim 1, wherein the audio communication comprises a standard telephone call.

8. The method of claim 1, wherein the user interface comprises at least one button, and wherein the detecting the activation of the user interface comprises the user activating the at least one button.

9. The method of claim 8, wherein the at least one button of the user interface comprises three buttons, a first button for sending data, a second button for receiving data, and a third button for synchronizing data.

10. The method of claim 1, wherein the detecting the activation of the user interface by the user comprises
    detecting the activation of a button by the user, or
    detecting the activation by the user of a visual representation of a button on a display.

11. A wireless device for communicating data on a voice channel, comprising:
- a processor for establishing an audio connection with a second device over the voice channel;
- an interface for a user for sending data to the second device;
- a detector for detecting the activation of the interface by the user; and
- a memory, communicatively coupled with the processor, for storing a first data, wherein the processor causes the first data to be sent to the second device over the voice channel during the audio connection with the second device when the detector detects the activation of the interface;
- wherein the processor also causes the first data to be transmitted wirelessly over the voice channel during the audio connection destined for reception by the second device and causes a second data to be wirelessly received over the voice channel during the audio connection, the second data being associated with the first data.

12. The wireless device of claim 11, further comprising:
- a memory for storing a second data received from the second device, the second data being associated with the first data.

13. The wireless device of claim 12, further comprising:
- a synchronizer for synchronizing the first data with the second data.

14. The wireless device of claim 13, further comprising:
- a memory for storing metadata for associating with the first data, the metadata indicating that the first data was synchronized.

15. The wireless device of claim 14, wherein the synchronizer further:
- automatically synchronizes the first data with the second data when the first data is modified and metadata associated with the first data indicates that the first data was synchronized.

16. The wireless device of claim 11, wherein the wireless device is a mobile telephone.

17. The wireless device of claim 11, wherein the audio connection comprises a standard telephone call.

18. The wireless device of claim 11, wherein the interlace comprises at least one button.

19. The wireless device of claim 18, wherein the interlace comprises three buttons, a first button for sending data, a second button for receiving data and a third button for synchronizing data.

20. A computer readable medium having stored thereon computer instructions executable by a wireless device that communicates data on a voice channel for causing the wireless device to perform the steps of:
- establishing an audio communication between the wireless device and a second device across the voice channel, wherein the voice channel comprises at least a wireless voice communications channel between the wireless device and the second device;
- providing a user interface for a user to use the wireless device for communicating data between the wireless device and the second device across the voice channel;
- detecting the activation of the user interface by the user;
- communicating over the voice channel a first data between at least the wireless device and the second device substantially during wireless audio communication between the wireless device and second device over the voice channel; and
- wirelessly transmitting the first data from the wireless device into the voice channel and destined for reception by the second device and wirelessly receiving a second data from the voice channel, the second data having been transmitted by the second device into the voice channel, the second data being associated with the first data.

21. The computer readable medium of claim 20, wherein the computer instructions further cause the wireless device to perform the steps of:
- wirelessly transmitting the first data from the wireless device into the voice channel and destined for reception by the second device; or
- wirelessly receiving the first data at the wireless device from the voice channel, the first data having been transmitted by the second device into the voice channel.

22. The computer readable medium of claim 21, wherein the computer instructions further cause the wireless device to perform the step of:
- synchronizing the first data with the second data for both the wireless device and the second device by wireless communication therebetween over the voice channel.

23. A wireless communication device for communicating data on a voice channel, comprising:
- a processor for establishing an audio connection with a second communication device;
- an indicator, communicatively coupled with the processor, for indicating to a user of the wireless communication device; and
- a memory, communicatively coupled with the processor, for storing a first information file and a second information file, and wherein the processor is for sending first data to the second communication device, the first data relating to the first information file, and wherein the processor is further for receiving second data from the second communication device and is for storing the received second data in the memory as the second information file, the first data and the second data having been wirelessly transmitted over the voice channel during the audio connection with the second communication device , and wherein the indicator is for indicating that at least the second information file has been created in the memory.

24. The wireless communication device of claim 23, wherein sending the first data and receiving the second data constitute an information exchange between the wireless communication device and the second communication device, the information exchange completing a predefined set of information exchanges relating to the first information file.

25. The wireless communication device of claim 23, wherein the second information file contains different information from the information in the first information file.

26. The wireless communication device of claim 23, wherein the second information file contains information relating to a Vcard.

* * * * *